(12) United States Patent
Jiang et al.

(10) Patent No.: US 11,583,955 B2
(45) Date of Patent: Feb. 21, 2023

(54) LASER WELDING UTILIZING BROADBAND PULSED LASER SOURCES

(71) Applicants: Shibin Jiang, Tucson, AZ (US); Jihong Geng, Tucson, AZ (US); Qing Wang, Tucson, AZ (US)

(72) Inventors: Shibin Jiang, Tucson, AZ (US); Jihong Geng, Tucson, AZ (US); Qing Wang, Tucson, AZ (US)

(73) Assignee: ADVALUE PHOTONICS, INC., Tucson, AZ (US)

( * ) Notice: Subject to any disclaimer, the term of this patent is extended or adjusted under 35 U.S.C. 154(b) by 797 days.

(21) Appl. No.: 16/533,310

(22) Filed: Aug. 6, 2019

(65) Prior Publication Data
US 2021/0039198 A1    Feb. 11, 2021

(51) Int. Cl.
| | |
|---|---|
| *B23K 26/324* | (2014.01) |
| *H01S 3/067* | (2006.01) |
| *H01S 3/11* | (2023.01) |
| *B23K 26/0622* | (2014.01) |
| *B23K 26/08* | (2014.01) |
| *B23K 26/21* | (2014.01) |
| *B29C 65/16* | (2006.01) |
| *C03B 23/20* | (2006.01) |
| *B23K 26/06* | (2014.01) |
| *H01S 3/16* | (2006.01) |

(52) U.S. Cl.
CPC ........ *B23K 26/324* (2013.01); *B23K 26/0624* (2015.10); *B23K 26/0665* (2013.01); *B23K 26/0876* (2013.01); *B23K 26/21* (2015.10); *B29C 65/1638* (2013.01); *C03B 23/20* (2013.01); *H01S 3/067* (2013.01); *H01S 3/11* (2013.01); *H01S 3/1608* (2013.01)

(58) Field of Classification Search
CPC ... B23K 26/324; B23K 26/0624; H01S 3/067; G02B 6/036
See application file for complete search history.

(56) References Cited

U.S. PATENT DOCUMENTS

| | | | |
|---|---|---|---|
| 2006/0233511 A9* | 10/2006 | Langhans | H01S 3/06708 372/6 |
| 2013/0112650 A1* | 5/2013 | Karam | B29C 65/1638 216/13 |
| 2013/0223792 A1* | 8/2013 | Huber | G02B 6/262 385/127 |
| 2014/0231021 A1* | 8/2014 | Liu | B23K 26/0624 219/121.64 |
| 2015/0121962 A1* | 5/2015 | Jiang | B23K 26/082 65/102 |
| 2015/0273624 A1* | 10/2015 | Yoshida | B32B 7/05 428/209 |
| 2021/0008664 A1* | 1/2021 | Kumkar | B23K 26/244 |

* cited by examiner

*Primary Examiner* — Geoffrey S Evans
(74) *Attorney, Agent, or Firm* — Quarles & Brady LLP; Yakov S. Sidorin (57) ABSTRACT

Method and system for a laser welding process employing the use of a single pulsed fiber laser source configured to generate a radiative output with a wavelength spectrum extending from about 1.8 microns to about 2.6 microns. In a specific case, the laser output from the single pulsed fiber laser source is focused onto the interface of the two pieces of materials at least one of which includes any of glasses, inorganic crystals, and semiconductors.

6 Claims, 7 Drawing Sheets

LASER WELDING UTILIZING BROADBAND PULSED LASER SOURCES

TECHNICAL FIELD

The present invention relates generally to material processing systems, and more particularly to methods for using a material processing system comprising a single broadband laser device.

BACKGROUND

Lasers have long been used for materials processing, including for applications in marking, drilling, ablating, scribing, cutting, and welding the material. While lasers commonly-used for such purposes include $CO_2$ lasers (generating radiation at 10.6 micron wavelength); a 1.06 micron wavelength Nd:YAG laser; a near-1-micron wavelength Yb-doped fiber laser; a 532 nm wavelength green-light-generating laser, a 355 nm wavelength UV laser, and 266 nm wavelength UV lasers, a skilled artisan will readily appreciate that the specific choice of a laser source for use in a particular application depends upon the detailed processing requirements. In some cases, the average output power is the most important factor. For example, for laser cutting and welding of metal, especially thick metal, the average output power has to be high enough to melt the relatively substantial amount of metal. In other cases, the pulse energy may become the most important factor. For example for drilling of materials, the pulse energy has to be high enough to remove the material in a short period of time. In order to drill the material while forming a clean edge, the pulse width (pulse duration) of the laser output is important as well. A shorter pulse can remove the materials in a shorter period of time, typically resulting in a hole with a cleaner edge. For example, a picosecond laser pulse can produce a cleaner hole than a microsecond laser pulse.

In many cases the laser wavelength is the most important factor, especially for processes where the absorption of laser energy is critical. When materials at issue exhibit stronger absorption, it is easier to perform the laser-induced material processing (such as marking, cutting, drilling, and welding).

Different materials, however, understandably have different absorption and reflection spectrum while the typical wavelength bandwidth of a laser used for processing such materials is only a few nanometers wide. In order to effectively expand the bandwidth, one solution is to combine different lasers. For example, U.S. Pat. No. 6,423,925 to Sukhman, et al discloses an apparatus and method for combining multiple laser beams in laser materials processing systems, where each one of multiple laser sources is independently separately mounted on a laser material-processing platform and the beam paths for such beams are combined with a combiner (which includes one or more optical elements mounted in the laser material-processing platform). The beam paths are parallel and collinear. The beam path for a beam from each laser source and the optical axis of the beam delivery system are each prealigned to the same predetermined reference and automatically coincide upon installation such that these components are rapidly and interchangeably interfaceable.

Similarly, WO 2005045476 by Fu et al discloses a multi-headed laser apparatus combining two or more lasers in a single housing with a single output beam. U.S. Pat. No. 6,462,306 to Kitai et al further discloses a system and method for materials processing using multiple laser beams. This system includes a laser supply system configured to supply discrete machining beams that are separated from each other. The laser outputs can have different wavelengths. For example, one laser may be a 1064 nm wavelength IR laser and the other may be a 355 nm wavelength UV laser.

However, combining of multiple lasers and/or laser outputs for material processing applications have numerous drawbacks that are not addressed in the prior art. First, ensuring that two or more different beams are focused to the exactly the same location is extremely challenging in practice. Considering that different laser beams have different discrete lasers (origins), the laser beams have to be aligned extremely well in order to reach exactly the same spatial location on the subjecting processing material after going through (traversing) various collimating and focusing optical elements. And that is notwithstanding the fact that substantially any vibration- and temperature-induced misalignment could cause the two laser beams to vary positions of their foci, which inevitably affects the material processing quality. For example, if the process is that for drilling holes, the hole will not remain circular as a result of the above-identified misalignments. If the processing is for cutting, the gap will be inevitably enlarged as a result of such misalignments, thereby missing the target value. If the processing is for marking, the marked line will be widened.

But a further practical drawback of utilizing the systems of related art is caused by the fact that each individual (constituent to the prior art system) laser source typically has a spectral linewidth of several (a few) nanometers, which simply cannot cover the absorption band of many materials. The total, aggregate spectral bandwidth of a multi-laser material-processing system of related is still relatively small even when several lasers are used. For example, the total laser bandwidth 1 still remains under 10 nanometers when three laser sources are combined. As a result, such a multi-laser processing system is typically custom designed for processing certain types of materials.

Moreover, even when multiple lasers are combined, the combined laser outputs are still produced by discrete lasers, so the laser wavelengths in such multiple laser outputs cannot be continuously varied due to the very discrete nature of the combination of the laser sources. And of course, the use of multiple lasers increases the price of the overall material processing system.

For some material processing applications (such as non-metal welding, for example), the control of the temperature around the welding spot is critical. For non-metallic materials, such as glasses, crystals, and semiconductors, the temperature of the welding spot surrounding area cannot be too high. Otherwise the caused residual stress in the material will be overwhelming and affect the welding quality. The welding time should be as short as possible in order to make sure the welding spot-size is well controlled. Therefore, a short-pulse laser source is needed.

Welding of the non-metallic materials—in contradistinction with metal welding—requires a laser light output with suitable absorption in target non-metallic materials for the welding process to occur. The absorption should not be too high and should not be too low. When the absorption is too high, the welding spot cannot be far below the top surface of the target material. If the absorption is too low, the welding spot has to be fully dependent upon the multiphoton absorption, thereby resulting in a high temperature gradient across the target material.

SUMMARY

In one implementation, invention provides a laser welding processing system that includes a pulsed fiber laser source having a fiber core and configured to generate a radiative pulsed output characterized by a continuous wavelength spectrum and a pulse width within the range from about 50 femtoseconds to about 1 microsecond. Such spectrum has a FWHM bandwidth in excess of 200 nm pulse width of from about 50 femtosecond to about 1 microsecond. In operation of the laser source, all spectral components of the radiative pulsed output that have different wavelengths are emitted into a medium surrounding said fiber laser source directly from said fiber core. Depending on the particular implementation, the laser material processing system is configured such that radiation from said pulsed output is absorbed by a component including glass and/or an inorganic crystalline material and/or a semiconductor material to weld such component to an auxiliary component.

Embodiments of the invention additionally provide a method for laser processing of a material. The method includes the step of generating a pulsed radiation output (which is characterized by a continuous wavelength spectrum and a pulse width within the range from about 50 femtoseconds to about 1 microsecond) from a laser source that includes a fiber core. The method additionally includes the steps of i) emitting the so-generated radiation output at each and every wavelength of the continuous wavelength spectrum from an output facet of the fiber core to a medium surrounding the laser source; and ii) delivering a focused beam of the radiation output to a target material. In one specific case, the process of generating the pulsed radiation output generating includes producing such pulsed radiation output from the fiber laser source. Alternatively or in addition, the method includes applying the radiative pulsed output to an interface between a first material and a second material to weld the first and second materials together. Here, at least one of the first and second materials is selected from a group comprising a glass, an inorganic crystal, and a semiconductor material. Alternatively or in addition, the method includes the process of spatially steering the radiation output.

BRIEF DESCRIPTION OF THE DRAWINGS

Implementations of the invention will become more apparent from the detailed description sent forth below when taken in conjunction with the drawings, in which like elements bear like reference numerals.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another

DETAILED DESCRIPTION

Embodiments of the present invention address the laser welding process carried out with the used of a broadband short pulse fiber laser. The target materials can be non-metallic materials such as glasses, crystals, and semiconductor, and the like.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

In one implementation, the embodiment of the present invention is directed to a material welding process using a broad band laser source referred to as a supercontinuum. As used herein, the term supercontinuum refers to a spectral bandwidth wider than 100 nm, which as will be appreciated by a skilled artisan is significantly wider than the total combined bandwidth of several typical lasers. As will be detailed below, the bandwidth of the supercontinuum is broadened to this degree though a nonlinear optical process.

Figure 1:
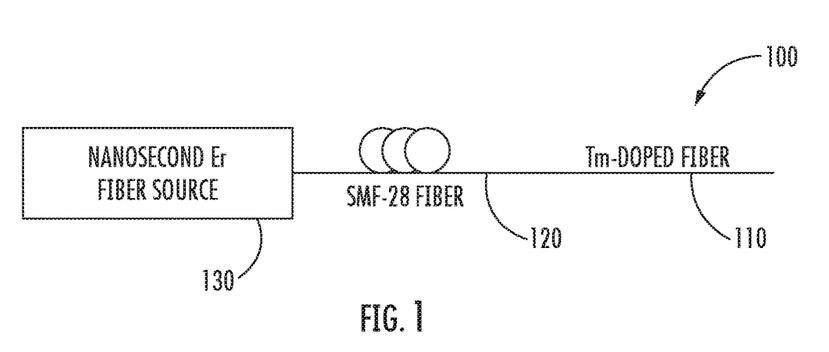
FIG. 1 is a schematic of an embodiment of a supercontinuum source of radiation for use with in an embodiment of the invention.

Turning now to FIG. 1, a schematic of one embodiment of a supercontinuum source, which can be used in implementation of the current system, is shown. The source 100 includes a nanosecond-pulse-pumped Tm-doped fiber amplifier specifically comprising a pump source 130 that is optically coupled to a first optical fiber 120, which in turn is further optically coupled to a Tm-doped fiber 110. In this embodiment, the pump source 130 is shown to include an Er-doped fiber MOPA (Master Oscillator Power Amplifier) system, which delivers laser pulses at 1.55 microns with a maximum average power of 1 W at a repetition rate of 10 kHz. In a related implementation, the pump may be also configured as a diode laser operating as a wavelength in the vicinity of (at about) 793 nm and appropriately coupled with the first optical fiber.

The first optical fiber 120 is a passive single-mode fiber selected to generate signal pulses at a wavelength near 2 microns as a result of nonlinear optical processes occurring in the fiber; in one example, Corning® SMF-28™ or a similar fiber can be used as fiber 120. In certain embodiments, the fiber 120 is chosen to be an approximately 5 m long. In other embodiments, the fiber 120 is longer or shorter than 5 m.

As stated, fiber 120 is coupled to the Tm-doped fiber 110. In certain embodiments, Tm-doped fiber 110 is 50 cm long. In other embodiments, fiber 110 is shorter is longer than 50 cm. In certain embodiments, Tm-doped fiber 110 is further a single-mode Tm-doped silica glass fiber. (The spatial cooperation of these two fibers 110 and 120 may be facilitated by, for example, fusion splicing).

Figure 2:
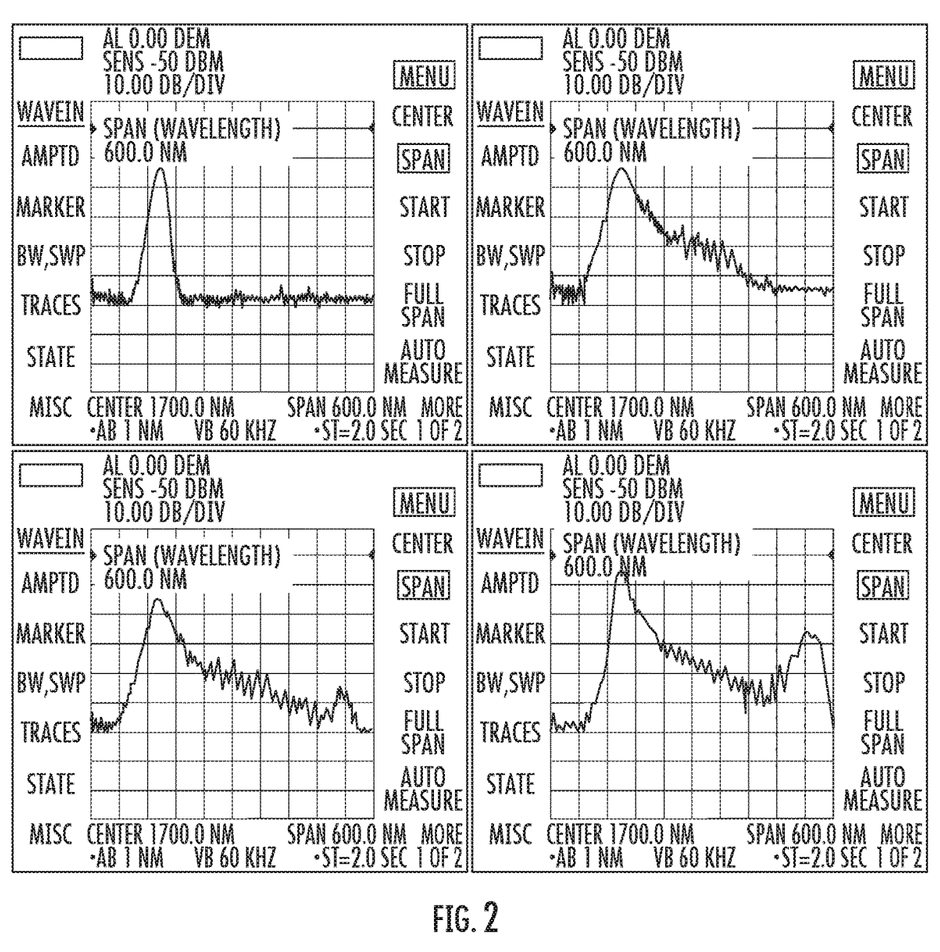
FIG. 2 depicts the spectral evolution of pump pulses in the passive fiber of the supercontinuum source at different pump power.
Figure 3:
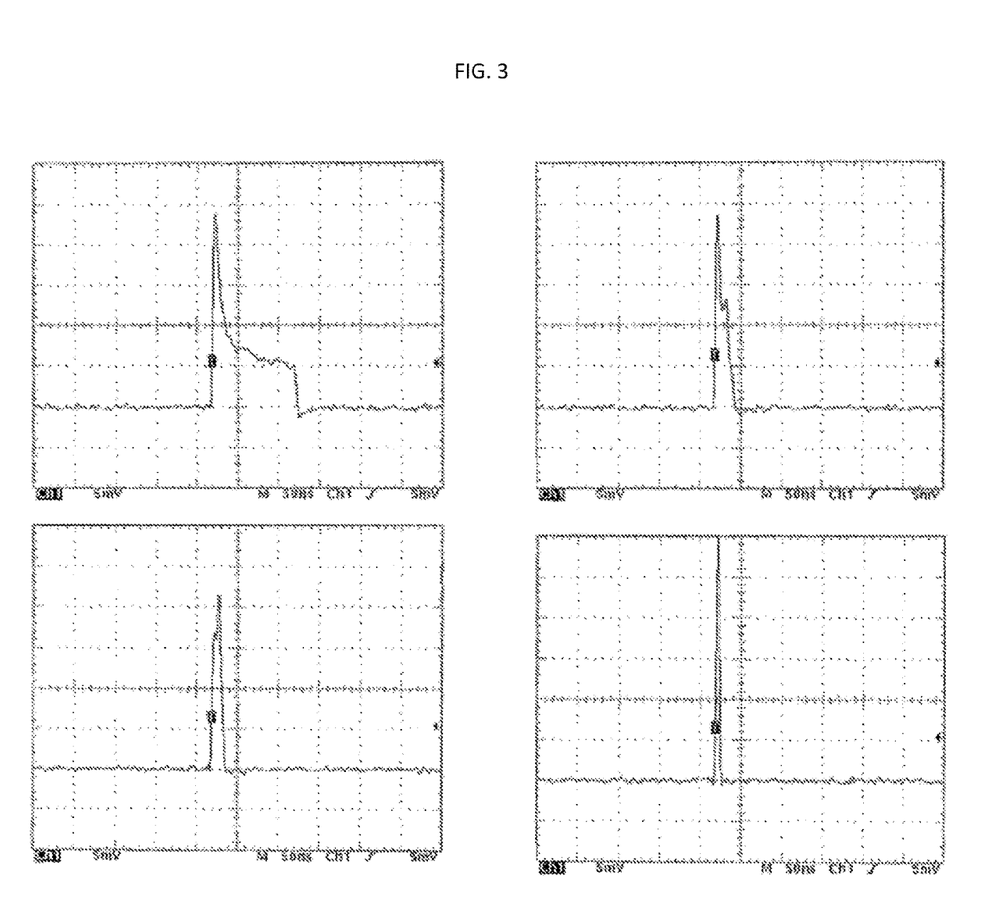
FIG. 3 includes four empirically-acquired traces illustrating evolution of the pulse shape in the passive fiber of the supercontinuum source at different wavelengths.

To appreciate the operational properties of the source of radiation 100, the properties of the fiber 120 should be considered. FIG. 2 by way of illustration depicts the spectral evolution of pump pulses in fiber 120 when the pump power is being increased. Since the laser pulses are spectrally-shifted only toward the long wavelength side, it is believed that the self-frequency-shifted Raman scattering dominates the nonlinear processes in the fiber, as opposed to the influence of the modulation instability (MI). As can be seen in FIG. 2, as the Er-laser power output is increased, a relatively strong spectral component near 1.95 microns gradually develops and becomes dominant. FIG. 3 further shows the typical pulse shapes at different wavelengths. As shown, the pulse duration reduces as the wavelength of the pulse increases. In particular, the strong spectral component near 1.95 □m has a much shorter duration than those of the pump pulses and the Raman-shifted pulses. The generated spectral component near 1.95 microns is attributed to soliton formation, induced by the pump pulses in the passive fiber 120. From the FWHM (full width at half maximum) bandwidth (approximately 40 to 50 nm) of the spectral component at 1.95 microns, a time-duration of approximately 200 to 300 fs might be expected if it were a soliton pulse.

Figure 4:
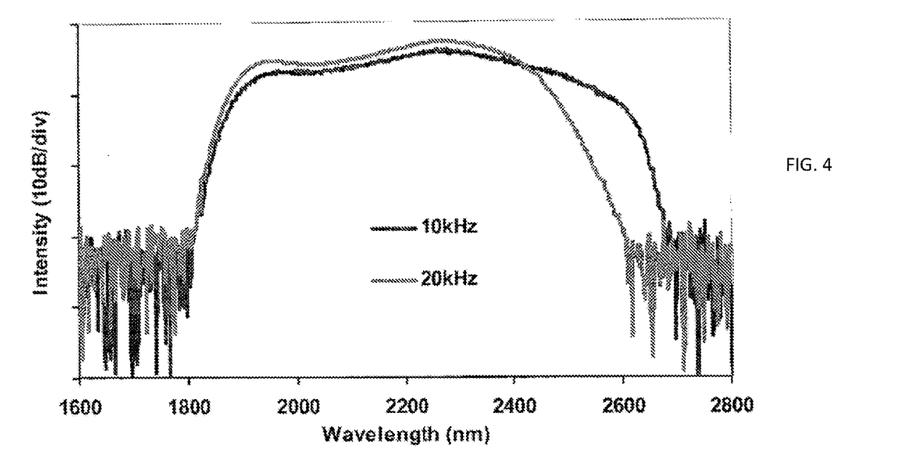
FIG. 4 presents the spectra of the mid-infrared supercontinuum pulses of the embodiment of the supercontinuum source.

With the addition of Tm-doped fiber 110 to the source 100, the laser energy is efficiently converted from a relatively-long pump pulse which is Raman-shifted at short wavelengths (those shorter than 1.8 microns) to a shorter pulse component at a long wavelengths (i.e., to a 1.95 microns wavelength pulse component). Specifically, when the pump pulses and the 1.95 microns pulses are launched into Tm-doped fiber 110, a broadband mid-infrared supercontinuum with high degree of spectral flatness is generated. FIG. 4 shows typical spectra of the generated from supercontinuum source 100 as measured with the use of an infrared monochromator. As shown in FIG. 4, the FWHM bandwidth is as wide as approximately 600 nm, and the bandwidth measured at a 20 dB level is approximately 900 nm from 1.8 microns all the way to the long-wavelength (of approximately 2.7 micron wavelength) edge of transparency edge of the gain fiber.

Figure 5A:
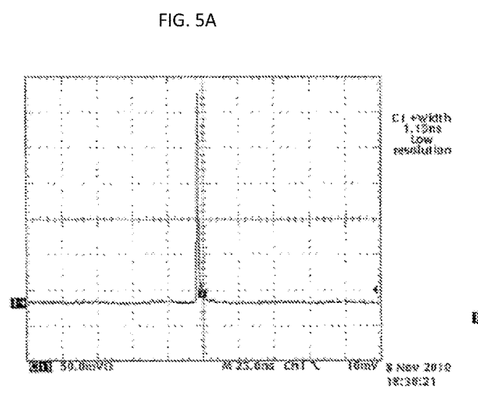
FIGS. 5A, 5B illustrate typical temporal profiles of the mid-infrared-wavelength supercontinuum pulses of the embodiment of the supercontinuum source at two different wavelengths chosen within the spectral range from about 0.9 micron to about 2.7 microns.
Figure 5B:
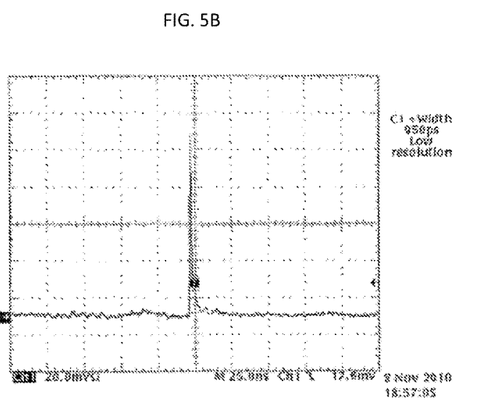

FIGS. 5A and 5B provide typical temporal profiles of the mid-infrared supercontinuum pulses of the source 100 at two different wavelengths. Here, temporal profiles (indicating pulse widths) are shown at two different wavelengths, chosen in these experiments to be within the band from about 900 nm to about 2.7 microns (and typically from about 1.8 microns to about 2.7 microns). The conventional monochromator was used as a spectral filter in these spectral measurements. As shown, the measured duration of the mid-infrared pulses is about 1 ns at both wavelengths, though this value may be limited by the resolution of the detection system. Further, as is shown in FIGS. 5A, 5B, the mid-infrared supercontinuum pulses also exhibit a similar single pulse shape with a pulse duration (approximately 1 ns), again as limited by the resolution of the detection system.

Figure 6:
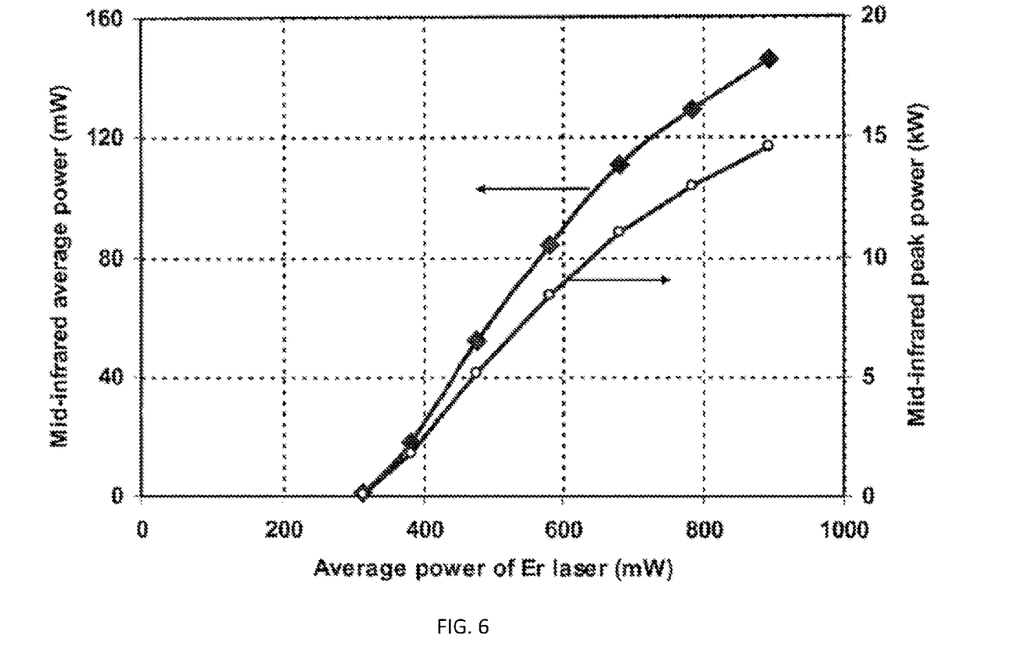
FIG. 6 depicts the average output power and the estimated peak power of the mid-infrared-wavelength pulses as a function of pump power at 10-kHz repetition rate.

FIG. 6 illustrates the average output power produced by the radiation source 100 as a function of the pump power at 10 kHz. As shown, almost the entire pump pulse and its Raman-scattering components are absorbed by the Tm-doped fiber, and converted into the longer wavelength radiation. The source 100 exhibits an operational threshold at a pump power level of about 300 mW, at which threshold the pulse components near 1.95 microns start to develop (see FIG. 2) and are further amplified in the Tm-doped fiber 110. As the pump power, received by the source 100, increases, the power of the radiation generated by the source 100 also proportionally increases, while the bandwidth of the mid-infrared radiation increases only slightly. The slope efficiency for a curve representing wavelength conversion from the near-infrared pump pulses to the mid-infrared pulses was determined to be about 32% at low pump power; this efficiency gradually decreases with increase of the pump power. The saturation in conversion efficiency at higher pump power levels, indicated in FIG. 6, is believed to be due to the fact that more energy was converted to the spectral components at longer wavelengths (those exceeding 2.7 microns), which spectral components were in turn absorbed by the silica gain fiber due to multi-phonon absorption in the fiber.

FIG. 6 additional illustrates the estimated peak power of the mid-infrared pulses of the source 100. This estimation was made by assuming the mid-infrared radiation was present in the form of 1-ns-long pulses (which was the upper limit of the available pulse duration) and then calculating the value(s) of the peak power of such mid-infrared pulses. As shown, the peak power of the mid-infrared pulses, emitted from the single-mode active fiber, was assessed to be as high as 15 kW or higher. Since the gain fiber in operation exhibited a mode-field diameter of about 6.5 microns and about 9.7 microns (at the wavelength of 1.8 microns and 2.7 microns, respectively), the estimated laser peak intensity of the supercontinuum pulses at the exit of the fiber 110 can be calculated to be exceeding 20 $GW/cm^2$.

Yet additional spectral broadening of the output from the source 100 can be achieved by passing/transmitting the output pulses through additional fiber optical elements. Specifically, a longer-wavelength extension of the wavelength spectrum of the output from the source 100 can be achieved as a result of optically-coupling (in one case—via butt-coupling) an infrared-light-transparent nonlinear optical fiber to the Tm-doped fiber 110. In certain embodiments, such nonlinear optical fiber transparent to infrared light can be chosen to be a GeSbSe chalcogenide glass fiber. In a specific case of such embodiments, the chalcogenide fiber has a core diameter of 30 microns with the numerical aperture NA of about 0.2, practically transparent (that is, with attenuation of less than 2 dB/m) in the spectral region from 2.0 microns up to 8.0 microns. In other embodiments, the infrared-light-transparent nonlinear fiber is chosen to be a single-mode fluoride glass fiber. In a specific case of this particular embodiment, the fluoride fiber has a core diameter of 7 microns with NA ~0.24, with a transparency of <0.3 dB/m in a narrower spectral range from 0.5 microns up to 4.0 microns.

Figure 7:
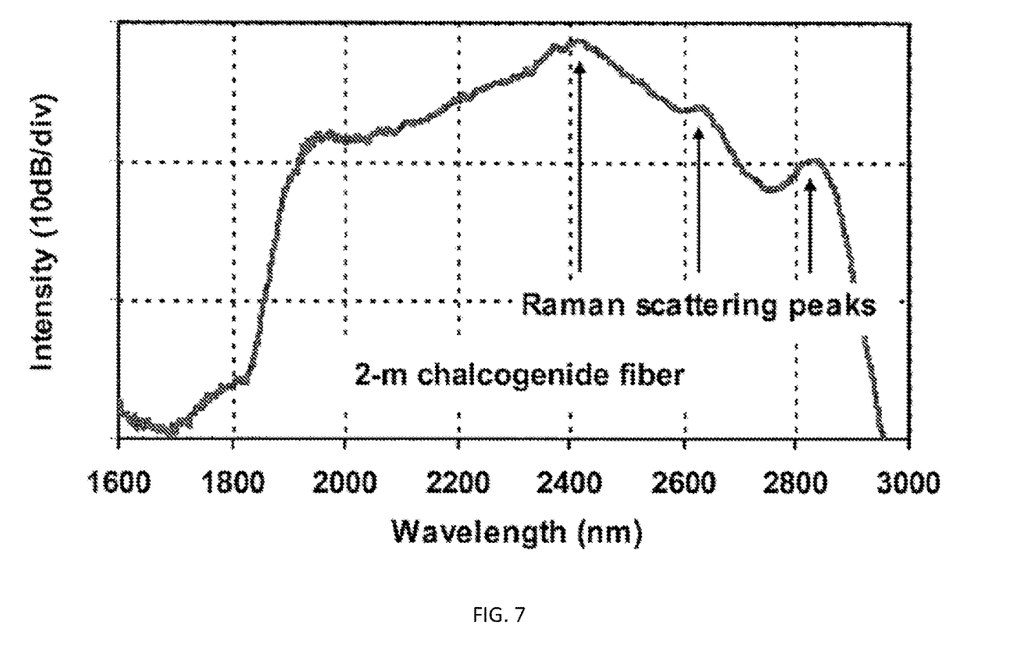
FIG. 7 shows the spectral broadening of the embodiment of the supercontinuum source with the addition of a 2-m chalcogenide glass fiber.

The curve of FIG. 7 represents the measured wavelength spectrum of pulsed radiation output, from the source 100, that have been additionally passed or traversed through a 2-m-long piece of the chalcogenide glass fiber (not shown in FIG. 1) when the high-peak-power mid-infrared pulses were launched. In comparison with the originally substantially flat spectral curves of FIG. 4, three additional spectral peaks at 2.4 microns, 2.6 microns, and 2.8 microns can be seen in the empirically-acquired spectrum of FIG. 7. Here, the long-wavelength edge of the mid-infrared pulses is pushed from 2.7 microns (as in FIGS. 4) to 2.9 microns. Since the frequency interval of the peaks is estimated to be approximately 250-300 $cm^{-1}$, these three peaks can be attributed to the cascaded Raman scattering in the chalcogenide glass fiber. Indeed, the Raman shift of Ge—Se bond has been reported in related art to be about 260 $cm^{-1}$.

Figure 8:
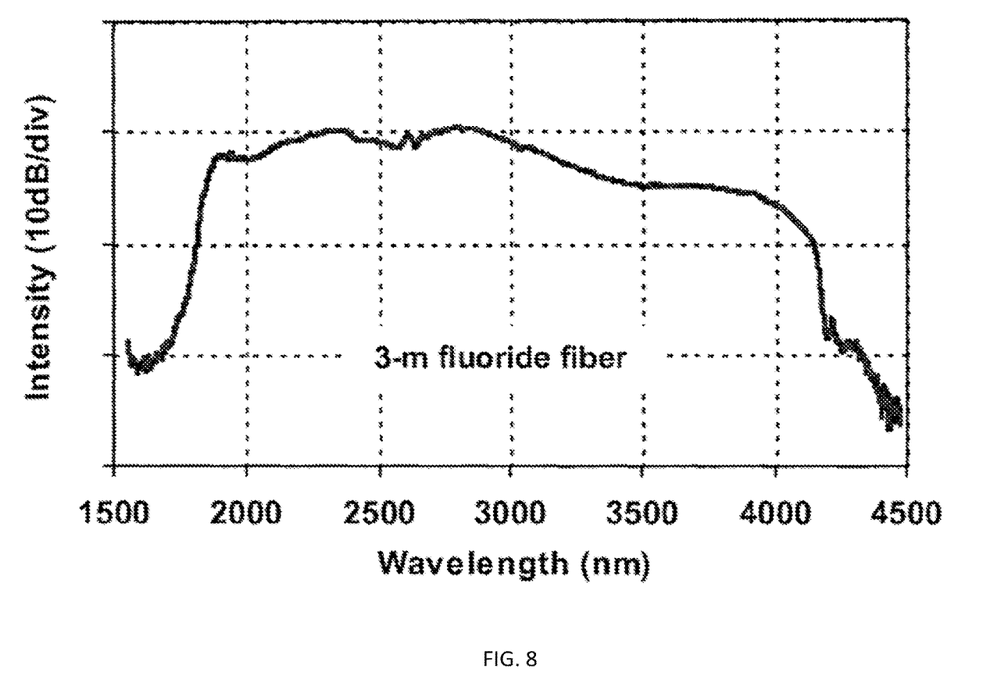
FIG. 8 illustrates the spectral broadening of the embodiment of the supercontinuum source with the addition of a 3-m fluoride glass fiber.

A person of skill in the art will readily appreciate that an even more efficient generation of mid-infrared supercontinuum is carried out when pulsed optical output from the source 100 is further passed or transmitted through the single-mode fluoride glass fiber (not shown in FIG. 1). Specifically, when a 3-m-long piece of the single-mode fluoride glass fiber is used, the spectral broadening spanning an octave is easily obtained. To this end, FIG. 8 shows the octave-spanning supercontinuum spectrum, which extends from 1.7 microns to 4.2 microns. The long-wavelength edge of this supercontinuum spectrum is limited, however, by the transparent limit of fluoride glass fiber.

The practical advantages of using the embodiment of the source 100 for laser materials processing are many. First, the extremely broad spectral bandwidth of the resulting optical output is found to cover the absorption band of many materials of interest. (In reference to FIG. 4, for example, the produced spectral band has a bandwidth of about 600 nm, making the discussed supercontinuum laser source spectrally-broad enough to cover some of the absorption bands of interest. Accordingly, the source 100 can be used for the materials welding process of different glasses, crystals, and semiconductors materials.

Further, continuous effects can be produced because of the continued wavelength of the laser source. The supercontinuum laser source 100 is a pulsed laser in time domain, but the laser wavelength at the output is continuous from near 1900 nm to near 2500 nm. As will be appreciated, various materials absorb energy at different wavelengths. So the laser energy of the output from the source 100 at a strong absorption wavelength(s) will produce more effect near the surface of the material of interest, while the laser energy at a weak absorption wavelength will produce more effect away from the surface (in the depth of the material), which may result in gradient effect (characterized by a spatial gradient of absorption). Furthermore, the laser wavelength spectrum within and across the spectral band of the output from the source 100 is quasi-continuous and not discrete. In other words, the separation of the wavelengths in the output spectrum is less than 0.01 nm.

Finally, when the source 100 is used, light at all and each of the wavelengths comes out of the same core of the same fiber. In other words, multiple spectral constituents of the laser output are by definition precisely spatially-aligned with one another. Accordingly, there are no and cannot be any alignment issues that are associated with combining multiple discrete lasers of the related art.

Figure 9:
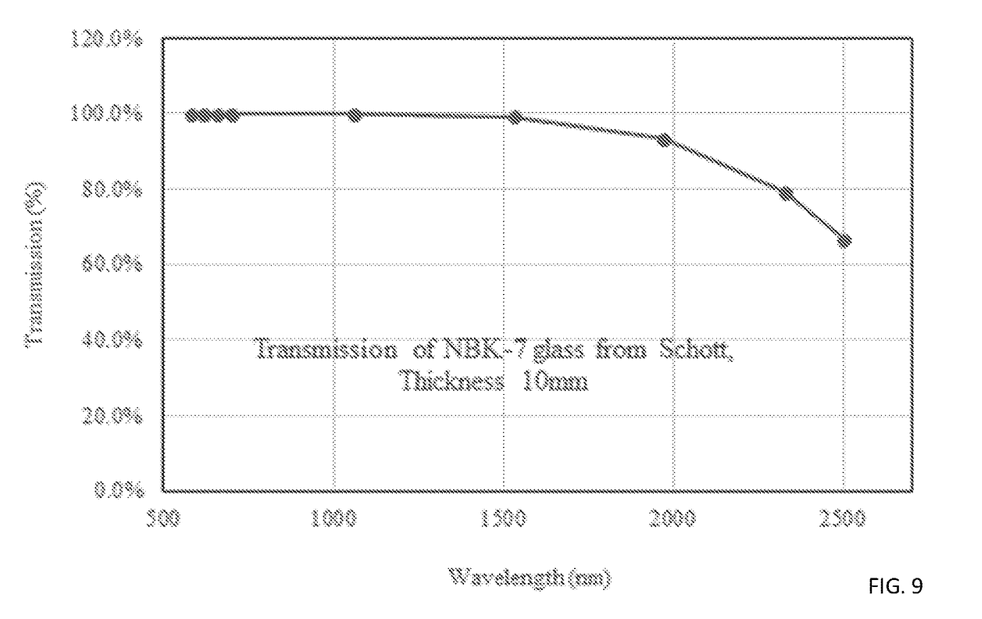
FIG. 9 depicts the transmission curve of a typical optical glass material.

To complement the discussion presented above, FIG. 9 depicts the transmission curve of a typical optical glass material. The glass materials exhibit a good transmission between about 0.4 micron to about 2.0 micron wavelength. The absorption increases slowly in most glass materials when the wavelength is longer than 2.0 microns, which are mainly caused by the absorption of OH.

Figure 10:
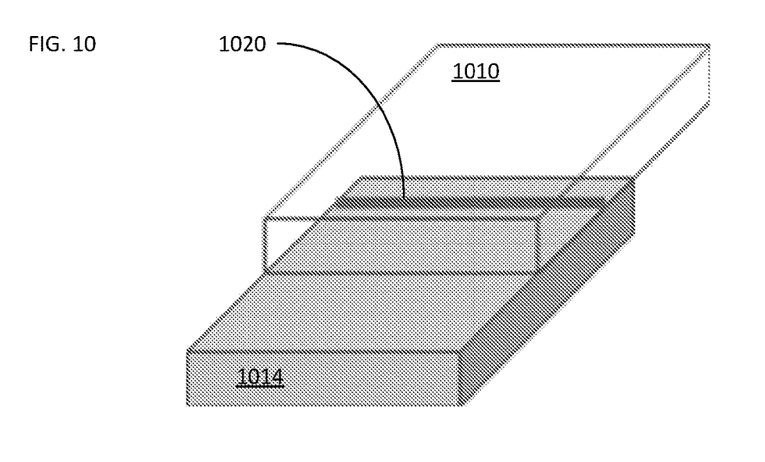
FIG. 10 illustrates the process of welding of two glasses.

FIG. 10 illustrates the process of welding of two pieces of glasses. The laser beam is focused on to the interface area of two pieces 1010, 1014 of glass. In order to effectuate welding (illustrated by the line 1020), the use of the broadband laser delivering the output at a laser wavelength longer than 2 micron is critical. The laser should have a short pulse width. The laser pulse width should preferably be between 50 femtosecond and 1 microsecond. The linear absorption is likely to reduce the temperature gradient and results in good welding quality.

Figure 11:
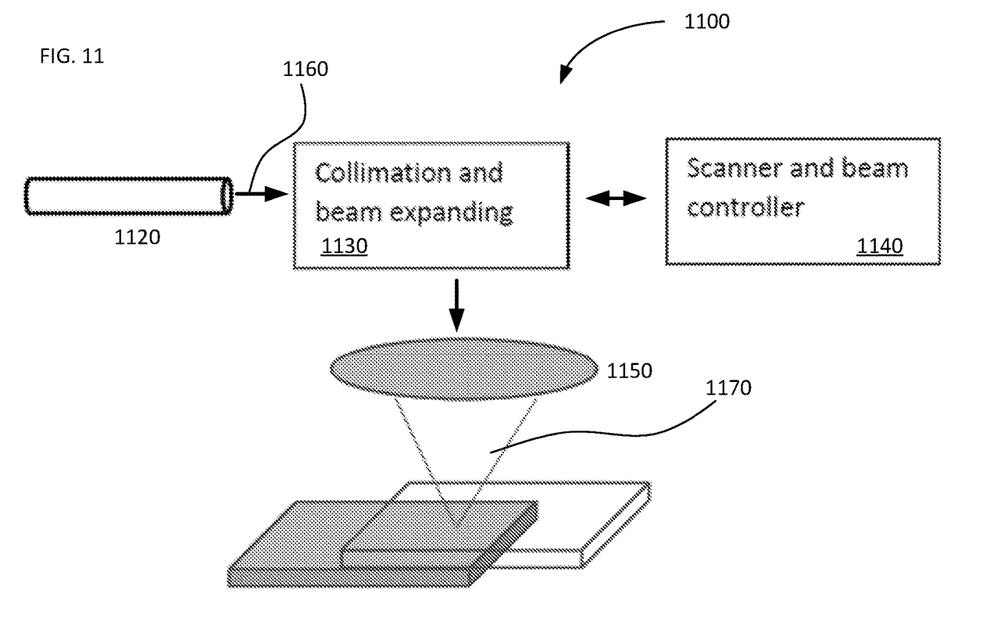
FIG. 11 is a schematic of a welding system.

FIG. 11 illustrates an embodiment 1100 of the apparatus for welding. The apparatus 1100 include a broadband fiber laser system 1120 that has described above, which is configured to produce a substantially-spectrally-continuous output with a long-wavelength edge of the spectrum at about 2.6 micron. The system 1120 can be complemented with a judiciously configured beam-collimating and/or beam-expanding optic-containing apparatus, shown as 1130. A beam-steering device 1140, operably connected with the apparatus 1130 and optionally containing a programmable processor, and a lens 1150 are additionally used to deliver the incident light to the material of interest (here shown as pieces 1010, 1014 with the interface between the pieces in a focal plane of the lens 1150.

The beam-steering device 1140 is configured to direct the lasing energy 1160 to a specific target location at the substrate(s). In certain embodiments, that specific target location is located on a top portion of a target substrate. In certain embodiments, that specific target location is disposed within target substrate. In certain embodiments, that specific target location is disposed on a bottom surface of target substrate.

In certain implementations of the operation of the broadband lasing device of the invention, the broadband lasing device is intermittently energized when beam-steering device 1140 has completed its positioning adjustment(s), and is then de-energized (or "off") until the beam-steering device has been engaged again. In other embodiments, broadband lasing device operates continuously as beam-steering device continuously changes the specific location of the intended target, thereby allowing scribing onto the surface of the target material substrate(s).

The setup illustrated in FIG. 11 can be used for welding crystalline materials and semiconductors. In most cases the setup may be modified. Almost in all the cases, a collimated laser beam output 1160 is focused on the target to achieve the desired result. In certain embodiments, the beam-steering device 1140 includes a galvanometer-based optical scanner where accurate and fast beam movements of the beam 1170, incident onto the target, are needed. In other embodiments, an X-Y translational positioner or station can replace the galvanometer-based optical scanner. In most cases, the focusing lens 1150 (or, alternatively or in addition, a reflective optics such as a mirror or a system of mirrors) is used to focus the laser beam. For example, a reflective focusing lens can be used, where metallic coating are often employed. In some cases, dielectric coating is used.

As those skilled in the art will appreciate, the beam-steering device 1140 is configured to continuously move a focal point of the laser beam 1170 across the surface of the target material inscribe the information onto such surface or within the body of the material.

Figure 12:
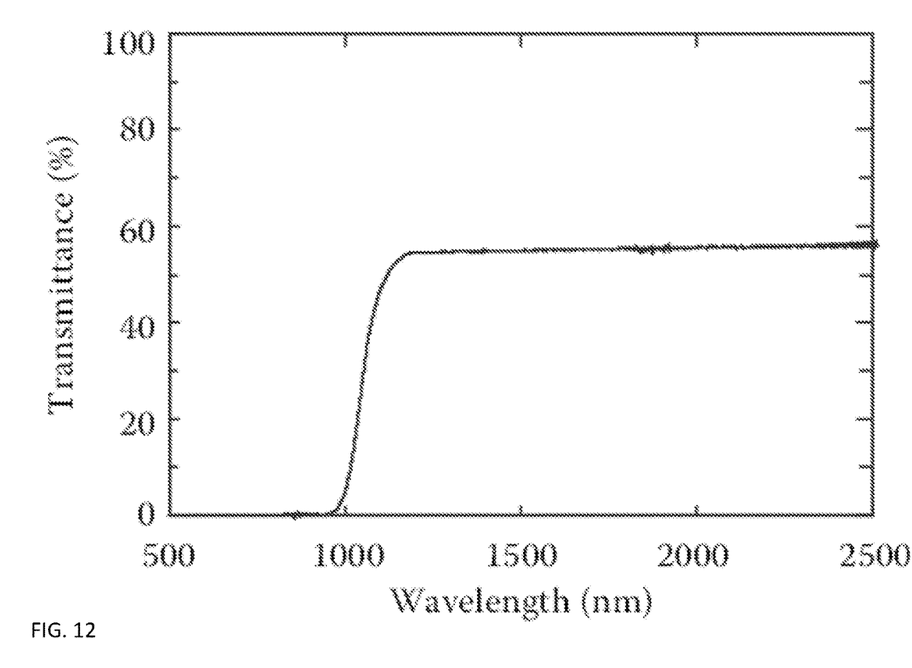
FIG. 12 is the transmission curve of silicon semiconductor substrate.

FIG. 12 illustrates the transmission curve of a silicon semiconductor substrate, which possesses high transmission at the wavelengths longer than 2 microns. The disclosed embodiment of the system provides an example of a proper source for focusing light inside the materials. In certain embodiments, the laser energy is incident on top surface of substrate, and that laser energy passes through the substrate to bottom surface to welding with other piece of materials.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

Other specific examples of the meaning of the terms "substantially", "about", and/or "approximately" as applied to different practical situations may have been provided elsewhere in this disclosure.

An embodiment of the system generally may include electronic circuitry (for example, a computer processor and/or controller, not necessarily shown in the Drawings) that governs an operation of the embodiment and controlled by instructions stored in a memory, to perform specific data collection/processing and calculation steps as disclosed above. The memory may be random access memory (RAM), read-only memory (ROM), flash memory or any other memory, or combination thereof, suitable for storing control software or other instructions and data. Those skilled in the art would readily appreciate that instructions or programs defining the operation of the present embodiment(s) may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement a method of the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

The invention as recited in claims appended to this disclosure is intended to be assessed in light of the disclosure as a whole. Various changes in the details, steps and components that have been described may be made by those skilled in the art within the principles and scope of the invention.

While the invention is described through the above-described exemplary embodiments, it will be understood by those of ordinary skill in the art that modifications to, and variations of, the illustrated embodiments may be made without departing from the inventive concepts disclosed herein. Accordingly, the invention should not be viewed as being limited to the disclosed embodiment(s).

We claim:

1. A method for laser processing of a material, the method comprising:

in a fiber laser including a nonlinear optical fiber that has a fiber core, generating a pulsed laser radiation output characterized by a continuous wavelength spectrum ranging from at least 1.8 microns to at least 2.6 microns and a pulse width within a range from about 50 femtoseconds to about 1 microsecond;

emitting said radiation output at each and every wavelength of the continuous wavelength spectrum from an output facet of said fiber core of the nonlinear optical fiber to a medium surrounding the fiber laser; and welding together a first material with a second material by delivering a focused beam of said pulsed laser radiation output to an interface between the first material and the second material, wherein at least one of the first material and the second material includes any of a glass, an inorganic material, and a crystalline material.

2. The method according to claim 1, wherein said generating includes:

generating, in a portion of the fiber laser preceding the nonlinear optical fiber, a first light having a first optical spectrum; and changing the first optical spectrum of the first light in a course of propagating the first light through the non-linear optical fiber.

3. The method according to claim 1, wherein said generating includes transmitting light, generated in a pump source, through a passive optical fiber of the fiber laser disposed between the pump source and the non-linear optical fiber.

4. The method according to claim 1, comprising spatially steering said pulsed laser radiation output.

5. The method according to claim 2, wherein the pump source includes a diode laser, and wherein the changing includes transforming the first optical spectrum to an optical spectrum ranging from about 1.7 microns to about 4.2 microns by passing the first light through a chalcogenide glass fiber of the fiber laser.

6. The method according to claim 1, wherein the welding includes welding together the first and second materials which are characterized by absorption at a wavelength within said continuous wavelength spectrum.

\* \* \* \* \*